US006453296B1

(12) United States Patent
Iwamura

(10) Patent No.: US 6,453,296 B1
(45) Date of Patent: *Sep. 17, 2002

(54) ELECTRONIC CREDIT SYSTEM AND COMMUNICATION APPARATUS

(75) Inventor: Keiichi Iwamura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,659

(22) Filed: Jan. 31, 1997

(30) Foreign Application Priority Data

Jan. 31, 1996 (JP) .............................. 8-016079
Jan. 31, 1996 (JP) .............................. 8-016080

(51) Int. Cl.[7] .............................................. G06F 17/60
(52) U.S. Cl. .............................. 705/1; 705/26; 705/35; 380/30; 380/45; 380/283
(58) Field of Search ................................. 380/4, 25, 24, 380/30, 45, 283; 705/18, 26, 44, 1, 35

(56) References Cited

U.S. PATENT DOCUMENTS

| | | | | |
|---|---|---|---|---|
| 5,319,710 A | * | 6/1994 | Atall et al. | 380/23 |
| 5,509,071 A | * | 4/1996 | Petrie, Jr. et al. | 380/4 |
| 5,557,518 A | * | 9/1996 | Rosen | 364/408 |
| 5,671,279 A | * | 9/1997 | Elgamal | 380/23 |
| 5,671,283 A | * | 9/1997 | Michener et al. | 380/25 |
| 5,724,424 A | * | 3/1998 | Gifford | 380/24 |
| 5,751,813 A | * | 5/1998 | Dorenbos | 380/49 |
| 5,790,677 A | * | 8/1998 | Fax et al. | 380/24 |
| 5,805,706 A | * | 9/1998 | Davis | 380/49 |
| 5,826,241 A | * | 10/1998 | Stein et al. | 705/26 |
| 5,848,161 A | * | 12/1998 | Luneau et al. | 380/49 |
| 5,995,626 A | * | 11/1999 | Nishioka et al. | 380/25 |

FOREIGN PATENT DOCUMENTS

| | | | | |
|---|---|---|---|---|
| DE | 4119924 A | * | 12/1992 | G06F/15/30 |
| WO | WO 95/10824 | * | 4/1995 | G07F/17/32 |

OTHER PUBLICATIONS

Secure Internet credit card pilot begins. (use of Internet for credit card purchases), Britt, Phil, America's Community Banker, v6, n4, p42(2), Apr., 1997.*
Coming soon to a computer near you: Secure Cyber shopping, Mott, Steve, Credit World v85n5 pp: 24–27 May/Jun. 1997.*
Marui's Instant Cards, Robins, Gary, Stores, v74n9 pp: 26, 32, Sep. 1992.*
Mastercard proposes SEPP, may mean dual standards, Phillips Business Information's Communications Standards News; Potomac; http://proquest.umi.com/pqdweb?TS=91926...mt=3&Sid=2&Idx=172&Deli=1&RQT=309&Dtp=1, Nov. 1, 1995.*
Donal O'Mahony, Michael Peirce, Hitesh Tewari, "Electronic Payment Systems", 1997.*

* cited by examiner

Primary Examiner—Stephen Gravini
Assistant Examiner—Yehdega Retta
(74) Attorney, Agent, or Firm—Fitzpatrick, Cella, Harper & Scinto

(57) ABSTRACT

An electronic credit system which employs terminals at a user's location, at a shop and at a credit agency. These terminals are in communication with each other; and they are constructed to send, receive and evaluate request, identification and credit information and to communicate credit and authorization information regarding ordered products.

24 Claims, 7 Drawing Sheets

REGISTRATION PHASE

TRANSACTION PHASE

REGISTRATION PHASE

TRANSACTION PHASE

REGISTRATION PHASE

TRANSACTION PHASE

REGISTRATION PHASE

TRANSACTION PHASE

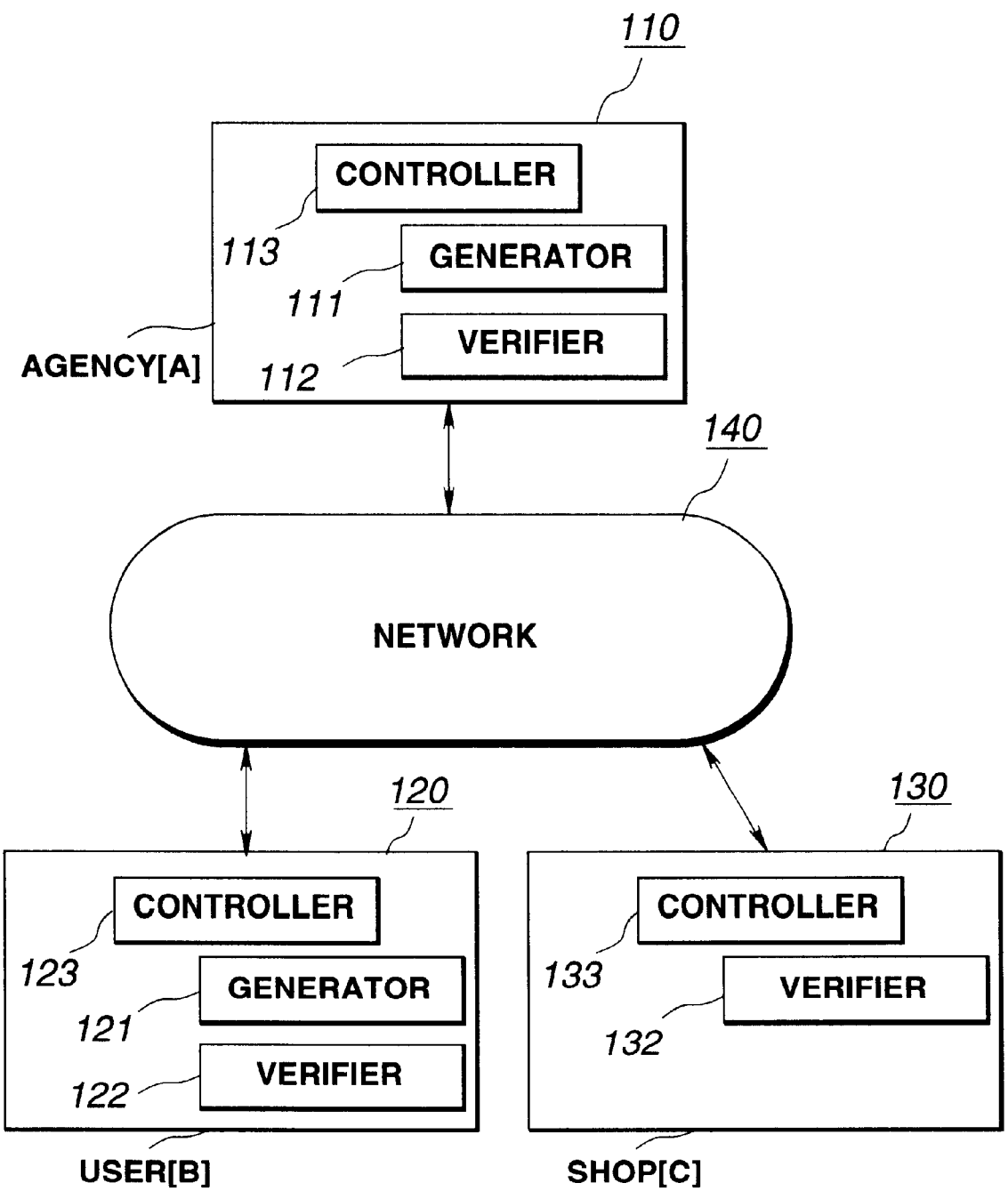

REGISTRATION PHASE

TRANSACTION PHASE

ELECTRONIC CREDIT SYSTEM AND COMMUNICATION APPARATUS

BACKGROUND OF THE INVENTION

1. Field of the Invention

This invention relates to an electronic credit system and more specifically to a communication apparatus used in this system for carrying out transactions involving information and commodities via a network.

2. Related Background Art

Optical fiber networks have been consolidated into the field of trunk communications; and because of this, cable television systems and local area networks have come into wide use. As a result, an electronic commerce for dealing in various goods by using these networks is about to become practicable.

In carrying out an electronic commerce, a payment system for collecting charges corresponding to the goods involved will be important.

Now it is well known to employ a credit system as a payment system. One type of credit system for use in a network is known as STT (Secure Transaction Technology). This system has been co-developed by Visa International and Microsoft Corporation. Another system is known as SEPP (Secure Electronic Payment Protocol). This system has been co-developed by Star Card International and NetScape.

The prior credit systems, such as the STT, SEPP are, however, associated with the following problems (1) The credit company can learn of the user's private information, for example, what the user is buying. Accordingly, the user's privacy is not protected in this system.

(2) If the goods involved are information, a cooling-off will not be acceptable for information provider. Because user can know the information by watching or using once, or can copy the information easily.

SUMMARY OF THE INVENTION

This invention is directed to overcoming the above described problems. It is an objective of the present invention to provide an electronic credit system which can solve the problems (1) and (2).

According to one aspect of the invention, there is provided an electronic credit system which comprises a first terminal for a user, a second terminal for a shop and a third terminal for an agency. These terminals are in communication with each other. The first terminal is constructed and arranged to send a credit request to the third terminal. The credit request includes information regarding the user as well as information regarding the amount of credit requested. The first terminal is also constructed and arranged to send to the second terminal a purchase request which includes money information regarding the user's credit and destination information regarding where the product is to be sent. The second terminal is constructed and arranged to initiate the sending of the product according to the request from the first terminal, and to send information regarding the cost of the product to the third terminal.

According to a second aspect of the invention, there is provided an electronic credit system which comprises a first terminal for a user, a second terminal for a shop and a third terminal for an agency, the terminals being in communication with each other. The first terminal includes a first encryption means for encrypting first information to be sent to the third terminal; and the second terminal includes a second encryption means for encrypting second information to be sent to the third terminal. The third terminal includes a third encryption means, corresponding to the first encryption means, for encrypting third information to be sent to the first terminal. In addition, the third terminal includes a fourth encryption means, corresponding to the second encryption means, for encrypting fourth information to be sent to the second terminal.

According to another aspect of the invention, there is provided an electronic credit system which comprises a first terminal for a user, a second terminal for a shop, and a third terminal for an agency, the terminals being in communication with each other. The first terminal has a first encryption means for encrypting first information to be sent to the third terminal, plus a second encryption means for encrypting second information to be sent to the second terminal. The second terminal has a third encryption means for encryption of third information which to be sent to the third terminal, plus a fourth encryption means corresponding to the second encryption means. Further, the third terminal has a fifth encryption means corresponding to the first encryption means, as well as a sixth encryption means corresponding to the third encryption means.

According to another aspect of the invention, there is provided an electronic credit apparatus for use by an agency. This apparatus comprises a user's electronic credit system apparatus, a shop's electronic credit system apparatus, and an agency's electronic credit system apparatus. The shop's and the agency's electronic credit system apparatus include first means for communicating with the user's electronic credit system apparatus by means of a first encryption key; and the agency's and the user's electronic credit system apparatus include second means for communicating with the shop's electronic credit system apparatus by means of a second encryption key.

According to another aspect of the invention, there is provided an electronic credit apparatus for use by a user. This apparatus comprises a user's electronic credit system apparatus, a shop's electronic credit system apparatus, and an agency's electronic credit system apparatus. The user's and the shop's electronic credit system apparatus include first means for communicating with the agency's electronic credit system apparatus by means of a first encryption; and the user's apparatus includes means for storing a secret encryption key for the first encryption.

According to another aspect of the invention, there is provided an electronic credit apparatus for use by a shop. This apparatus comprises a user's electronic credit system apparatus, a shop's electronic credit system apparatus and an agency's electronic credit system apparatus. The user's and the shop's electronic credit system apparatus include first means for communicating with the agency's electronic credit system apparatus by means of a first encryption; and the shop's apparatus includes means for storing a secret encryption key for the first encryption.

According to another aspect of the invention, there is provided an electronic credit system which comprises a first terminal for a user, a second terminal for a shop and a third terminal for an agency. The first terminal includes means for generating a digital signature and means for verifying the digital signature. The second terminal includes means for verifying the digital signature. The third terminal includes means for generating a digital signature and means for verifying the digital signature. The means for generating the digital signature and the means for verifying the digital signature incorporate a secret key and a public key.

According to another aspect of the invention, there is provided an electronic credit system for use by an agency. This system comprises a user's electronic credit system apparatus and a shop's electronic credit system apparatus. This apparatus comprises means for generating an agency's digital signature and means for verifying the user's digital signature.

Also, according to another aspect of the invention, there is provided an electronic credit apparatus for use by a user. This apparatus comprises an agency's electronic credit system apparatus and a shop's electronic credit system apparatus, plus means for generating a shop's digital signature and means for verifying the agency's digital signature.

BRIEF DESCRIPTION OF THE DRAWINGS

FIG. 6 is a block diagram showing terminal devices of the fourth embodiment;

DETAILED DESCRIPTION OF THE PREFERRED EMBODIMENTS

Figure 1A:
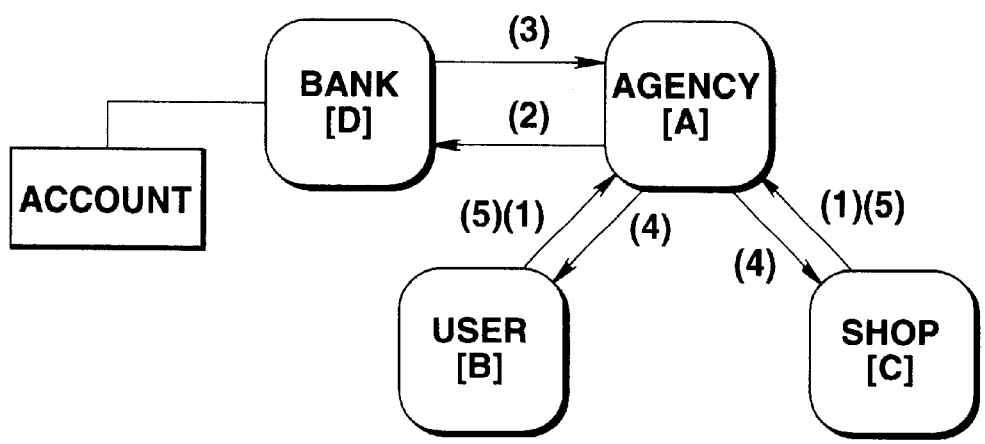
FIG. 1(a) is a block diagram showing a first embodiment of the invention as used in a registration phase.
Figure 1B:
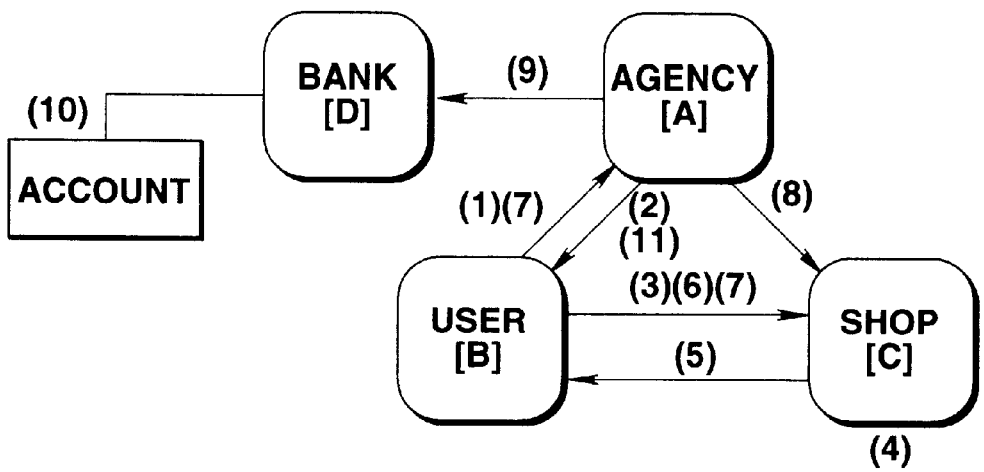
FIG. 1(b) is a block diagram showing the first embodiment as used in a transaction phase.

The first embodiment of this invention will be described with reference to FIGS. 1(a), 1(b) and 2. The electronic credit system of this embodiment comprises an agency [A], a user [B], a shop retailer [C], and a financial body, such as a bank [D]. These elements are connected in a network as shown in FIG. 1.

The agency [A], which may be a credit company, collects deposits from the user [B] and from the shop retailer [C]. The agency [A] also receives payments from the user [B] and executes payments to the shop [C]. The agency [A] also has a means for processing encryption. The user [B] makes use of a credit system managed by the agency [A]. The shop [C] joins the credit system. The bank [D] keeps accounts of the user [B] and the shop [C].

While only a single user [B], shop [C], and bank [D] are shown, there may be several users, shops and/or banks.

Figure 2:
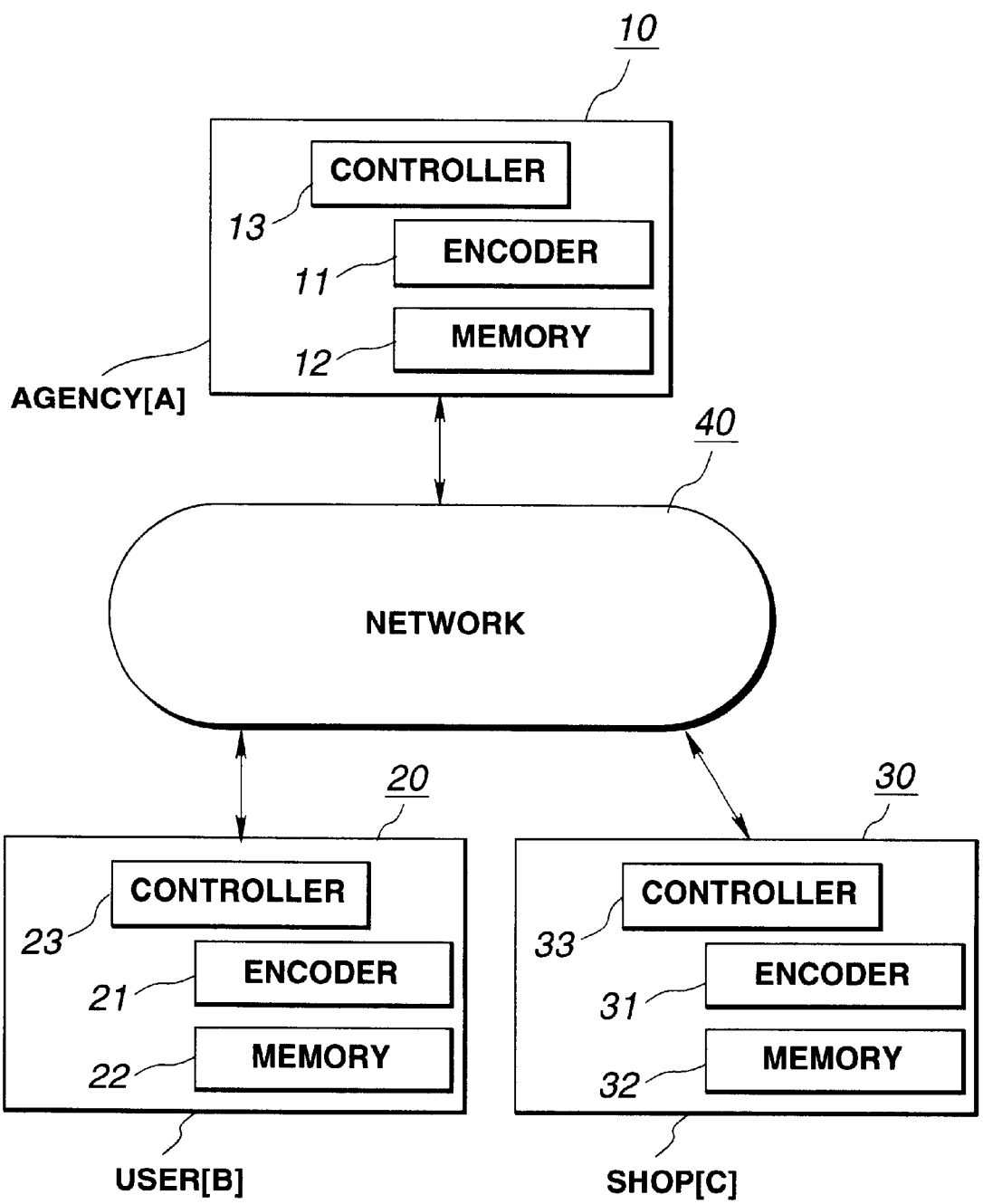
FIG. 2 is a block diagram showing terminal devices of the first embodiment.

FIG. 2 shows a credit system which comprises terminal devices 10, 20 and 30. These terminal devices are connected by network 40. As also shown in FIG. 2, numeral 10 represents a terminal device for the agency [A], numeral 20 represents a terminal device for the user [B], and numeral 30 represents a terminal device for the shop [C]. Each terminal device 10, 20, and 30 has an encoder 11, 21, 31 for processing an encryption operation. Each terminal device also has a memory 12, 22, 32 for storing a secret encryption key, and a controller 13, 23, 33.

The encoders 11 and 21 of the terminal devices 10 and 20 have algorithms which are in common with each other. Also, the common secret keys are stored in the memories 12 and 22 respectively. In the same way, the encoders 11 and 31 of the terminal devices 10 and 30 have algorithms which are in common with each other. Further, the common secret keys are stored in the memories 12 and 32, respectively. Similarly, the encoders 21 and 31 of the terminal devices 20 and 30 have algorithms which are in common with each other; and the common secret keys are stored in the memories 22 and 32 respectively. The controllers 13, 23 and 33 control such operations as communication, processing, accessing control, etc., of the terminal devices 10, 20 and 30.

The operation of this embodiment will now be described. The operation includes a first phase for registration and a second phase for transactions.

First Phase—Registration of an Enrollment (FIG. 1(a))

1. The user [B] and/or the shop [C] applies for enrollment with the agency [A] and supplies the agency [A] with the user's or the shop's name, address, bank account number and any other relevant information, for example, its seal, signature, etc.

2. The agency [A] confirms the user's or shop's application and whether or not its bank account is payable.

3. If the application is correct and the account is payable, the agency [A] enrolls the user [B] and/or the shop [C] as a member.

4. The agency [A] provides an encryption means to the enrolled user [B] or shop [C]. This encryption means includes special software or hardware which enables the user to carry out general common key encryption operations by use of a common key cryptosystem. In this embodiment, a message M is encrypted by using a key KB which is represented as [M]*KB.

5. The user [B] and/or the shop [C] use the encryption means to generate a secret encryption key (KB) or (KC) for communication with the agency [A]. The user or shop, and the agency, keep this secret key (KB) or (KC) confidential. Alternatively, the agency [A] may generate the secret key (KB) or (KC) and provide a memory card with this key recorded thereon which it gives to the user [B] and/or the shop [C].

If the agency [A], the user [B] and the shop [C] already have a common encryption means, steps (4) (5) can be omitted.

Second Phase—Carrying Out a Transaction (FIG. 1(b))

1. The user [B] sends the following Message (1) to the agency [A] which contains a request for a credit which will be sent to the shop [C] when the user [B] makes a trade with the shop.

Message (1)=[B], [[B], [Request for Credit], [A]]*(KB).

2. The agency [A] decrypts the Message (1) by using the user's key [KB]; and then the agency checks to ascertain whether or not the Message (1) is correct and if the requested credit is available. If the Message is correct, and if the credit is available, the agency [A] sends the following Message (2), with the above credit, to the user [B].

Message (2)=[credit, T, CK]*KB.

Credit=[T, Y, CK]*KA.

In this equation, T represents a time stamp for specifying the time of the request, Y represents the term of validity of the user's registration and CK represents a disposal key which is used to encrypt a single transaction between the user [B] and the shop [C].

3. The user [B] decrypts the Message (2) by using the key [KB], and takes the credit, T, and the single transaction key CK. The user [B] then places an order for desired products G to the shop [C] by sending the following Message (3) to the shop [C]:

Message (3)=[T, product G, address (destination of user [B])]*CK.

4. The shop [C] decodes the order by using its secret key [KC]; and confirms the term of validity of the user's credit. The shop [C] then decodes the remaining information by using the disposal key CK, and confirms the time stamp T, the product G and the address.

5. The shop [C] delivers the product G to the user [B].

6. Upon receipt of the product, the user [B] sends the following Message (4) to the agency [A] and to the shop [C].

Message 4=[T, shop [C], Charge P]*KB.

7. If the user [B] would like to return the product G within a cooling off period, the user [B] may return the product G together with the following Message (5) to the shop [C]:

Message (5)=credit, [T, instruction for cancellation]*CK.

At the same time, the user [B] will also send the following Message (6) to the agency [A]:

Message (6)=[B], deposit, [T, instruction for cancellation]*CK.

8. After the predetermined period, (i. e. the cooling off period) the shop [C] may regard the transaction as complete; at which time the shop [C] sends the following Message (7) to the agency [A]:

Message (7)=[C], [credit], [Message (4)]*CK.

The key CK can be used in steps 7. and 8. because these steps are part of the original transaction.

9. If the agency [A] does not receive the Message (6) within the predetermined period, but does receive the Message (7), the agency [A] confirms the Message (7) and verifies the completion of the transaction, for example by checking both the charge in the Message (4) and the charge in the Message (7).

If the checking shows that the transaction is complete, the agency [A] requests the bank [D] to transfer the charge from an account of the user [B] to an account of the shop [C].

(10) The bank [D] executes the transfer according to the request.

(11) The agency [A] notifies the user [B] of the transfer.

In this embodiment, the agency [A] will know that the user [B] has purchased some product at a cost of P, but the agency [A] cannot know what product or products the user [B] has purchased. Also, the shop [C] does not obtain personal information regarding the user [B], such as the condition of the user's account.

Therefore the privacy of the user [B] is protected, because no single entity has access to all of the information relating to the user [B].

It will be noted that in the above described embodiment, if the only one credit is issued at a given time, the time stamp T may be omitted. This is because, a single credit corresponds to one transaction.

A serial number, or random numbers, may be used instead of the time stamp, so long as those numbers directly correspond to a particular transaction.

If the shop [C] provides encryption key software in advance, all of the communications involved in the carrying out of an application (Second Phase) will be able to be encrypted.

Second Embodiment

Figure 3A:
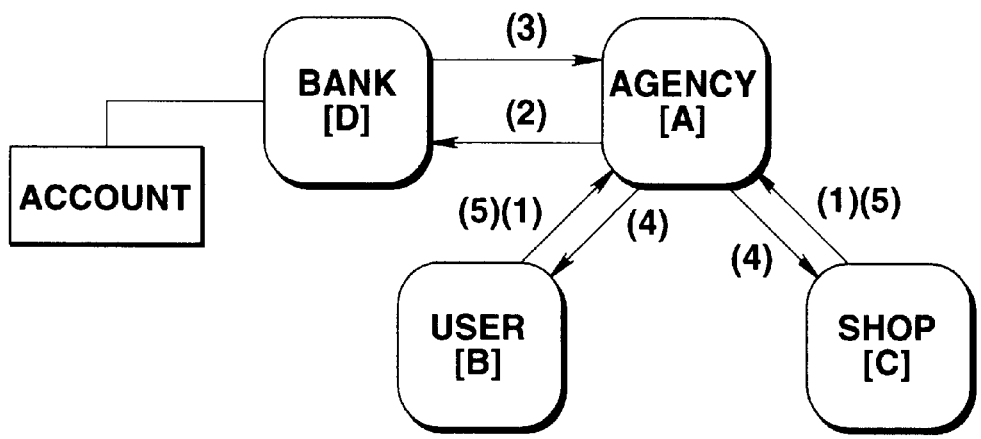
FIG. 3(a) is a block diagram showing a second embodiment of the invention as used in a registration phase.

The second embodiment of this invention will be described with reference to FIGS. 3(a) and 3(b).

The electronic credit system of this embodiment is basically the same as the first embodiment.

However the product G in this embodiment is information, for example a motion picture, computer software, etc. In this case, the shop [C] delivers the information as the product G via network in response to a request by the user [B].

The operation of this embodiment will be described next. The operation includes a first phase for registration (FIG. 3(a)) and a second phase for carrying out a transaction (FIG. 3(b)). The first phase in the second embodiment is the same as the first phase of the first embodiment and no further discussion will be given.

Figure 3B:
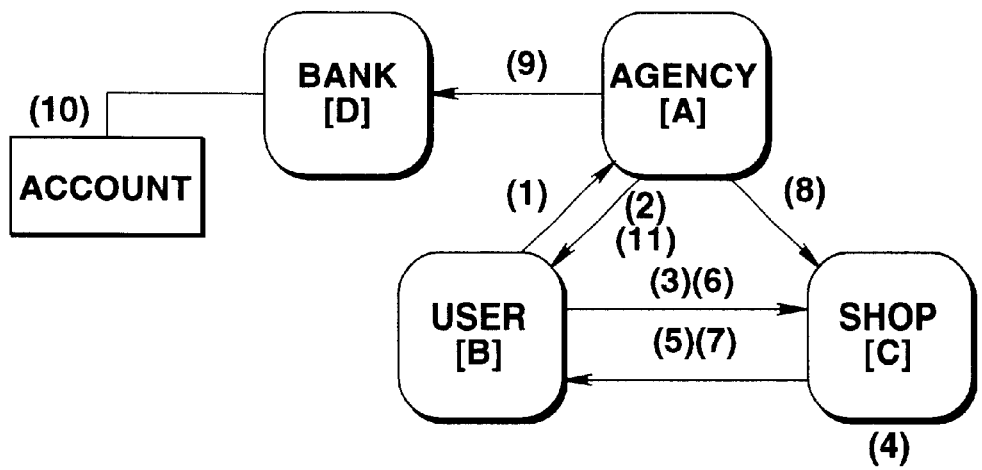
FIG. 3(b) is a block diagram showing the second embodiment as used in a transaction phase.

The Second Phase—Carrying Out a Transaction (FIG. 3(b))

1. The user [B] sends the following Message (8) to the agency [A] and requests that a credit to be sent to the shop [C] when the user [B] makes a trade with the shop [C]:

Message (8)=[B], [[B], [Request for Credit], [A]*KB;

2. The agency [A] decrypts the Message (8) by using the user's key KB, and checks the Message (8) to ascertain whether or not the Message is correct. If it is correct, the agency [A] sends the following Message (9) with the above credit to the user [B]:

Message (9)=[credit, T, CK]*KB.

Credit=[T, Y, CK]*KA.

In this equation, T represents a time stamp for specifying time, Y represents a term of validity of the user's registration, and CK represents disposal key which is used to carry out a single encrypted transaction between the user [B] and the shop [C].

3. The user [B] decrypts the Message (9) by using the key KB, and stores the credit, the time T, and the key CK. Thereafter, the user [B] may order products from the shop [C] by sending the following Message (10) to the shop [C]:

Message (10)=[T, product G, address (destination of user [B])*CK.

4. The shop [C] decodes the credit by using the secret key KC and confirms the term of its validity. Then the shop [C] decodes the remaining information by using the disposal key CK, and confirms the time stamp T, the product G, and the address.

5. The shop [C] delivers the following Message (11) to the user [B]:

Message (11)=[Product G (in the form of encrypted information E, [Unencrypted Header (H) of the information] and encrypted information.

In this equation, the header (H), which is not encrypted, includes the time stamp T, a digest or part of the information E, an explanation regarding the information E, a charge, etc.

Also, in this equation, the encrypted information (E)= [product G (in the form of information E]*CK'. CK' refers to a key for encryption of this information which is provided by the shop [C].

6. The user [B] receives the header H of the information E; and if the user decides to purchase the information E, the user sends the following Message (12) to the shop [C] and to the agency [A]:

Message (12)=[$T$, shop [$C$], Charge $P$] *KB.

7. After receiving the Message (12), the shop [C] sends the following Message (13) for decoding the information E to the user [B].

Message (13)=$T$, [$T$, $CK'$]*CK.

8. After receiving the Message (13), the shop [C] regards the transaction as valid and sends the following Message (14) to the agency [A].

Message (14)=$C$, deposit, [Message (12)]*KC.

9. The agency [A] examines the validity of the transaction, for example by checking both the charge in the Message (12) and the charge in the Message (14).

If the transaction is valid, the agency [A] requests the bank [D] to transfer the charge from an account of the user [B] to an account of the shop [C].

10. The bank [D] executes the transfer according to the request.

11. The agency [A] then notifies the user [B] of the completion of the transfer.

In this embodiment, a waiting period is avoided by confirming the header H in advance. Also, while the agency [A] will know that the user [B] has purchased some product having a worth P, the agency [A] will not know the specific product that the user [B] has purchased. Further, the shop [C] will not learn of any personal information such as the user's account.

Therefore, in this embodiment also, the privacy of the user [B] is protected because no single entity can obtain all of the information regarding the user.

Third Embodiment

The third embodiment of this invention will be described with reference to FIGS. 4(*a*) and 4(*b*).

The electronic credit system of this embodiment is basically the same as the second embodiment.

However, in this embodiment, a communication for requesting a credit is not required. This is because a special code name has already been provided to the user [B] in the first phase. The code name verifies the credit of the user [B].

The operation of this embodiment will be described next. The operation consists of a first phase for registration and a second phase for carrying out a transaction.

Figure 4A:
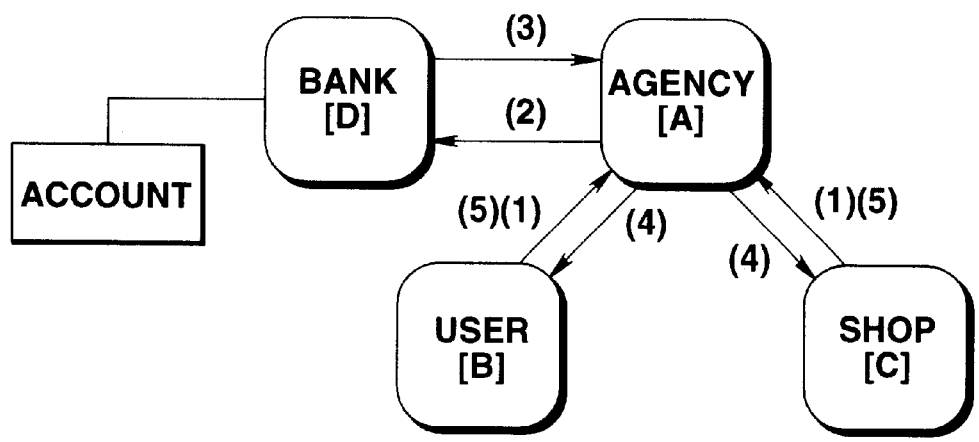
FIG. 4(a) is a block diagram showing a third embodiment of the invention as used in a registration phase.
Figure 4B:
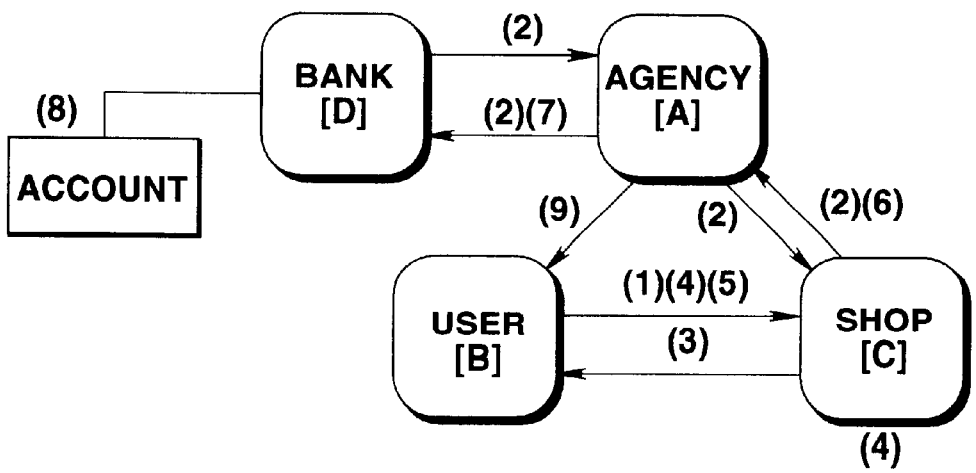
FIG. 4(b) is a block diagram showing the third embodiment as used in a transaction phase.

First Phase—Registration (FIG. 4(*a*))

1. The user [B] applies for enrollment with the agency [A]; and supplies the agency [A] with the user's code name (ID) (similar to a pen name), the user's address, name, bank account number, signature, etc.

Steps 2 to 5 are the same as for the first embodiments. Therefore, the description regarding those steps will not be repeated.

Second Phase—Carrying Out a Transaction (FIG. 4(*b*))

1. The user [B] sends the following Message (15) to the shop [C] and requests a product G or information E:

Message (15)=ID, $T$, $G$, Address (destination).

2. The shop [C] transmits the ID, G, and charge for the product G to the agency [A]. The agency [A] identifies the user [B] by consulting the ID; and then the agency [A] checks on the user's solvency and advises the shop [C].

3. The shop [C] delivers the information E or the product G to the place specified in the address.

4. The user [B], after receiving the product G or the information E, sends the following information (16) to the shop [C] and to the agency [A]:

Message (16)=[$T$, shop [$C$], Charge $P$]*KB.

5. During a predetermined cooling off period following delivery of the product to the user [B], the user [B] may return the product G or the information E to the shop [C]. Also, during the cooling off period, the user [B] sends the following Message (17) to both the shop [C] and the agency [A]:

Message (17)=ID, $T$, Message for Cancellation.

6. If, after the predetermined cooling off period, the product or information has not been returned, the shop [C] may regard the transaction as valid. In such case, the shop [C] sends the following Message (18) to the agency [A]:

Message (18)=[$C$], [ID, Message (16)]*KC.

7. If the agency [A] does not receive the Message (17) within the predetermined cooling off period, the agency [A] examines whether the transaction was correct, for example by checking both the charge in the Message (16) and the charge in the Message (18).

If the transaction is correct, the agency [A] requests the bank [D] to transfer the charge from an account of the user [B] to an account of the shop [C].

8. The bank [D] executes the transfer according to the request.

9. The agency [A] notifies the user [B] of execution of the transfer.

In this embodiment, the agency [A] cannot know what the user [B] has purchased from the shop [C]. Also the shop [C] cannot know who purchased the product G. This is because the shop [C] does not know the person who has the identification ID.

Therefore, since in this embodiment, no entity has access to all of the user's information, the user's privacy is protected.

This embodiment, like the second embodiment, can be used for transactions involving information such as motion pictures or software.

Fourth Embodiment

The fourth embodiment of this invention will be described with reference to FIGS. 5(*a*), 5(*b*) and 6.

The electronic credit system of this embodiment is basically the same as the first embodiment. However, this embodiment involves the use of digital signature technology in the electronic credit system.

The electronic credit system of the fourth embodiment consists of an agency [A], a user [B], a shop (e.g. a retailer) [C], and a financial entity such as a bank [D]. These units are connected in a network as shown in FIG. 5.

The agency [A], which may be a credit company, receives collections from the user [B] and from the shop [C], and executes payments to the user [B] and the shop [C]. The agency [A] includes means for processing a digital signature. The user [B] makes use of a credit system managed by the agency [A]. The shop [C] joins this credit system. In this credit system, the bank [D] keeps accounts of the user [B] and of the shop [C].

It should be understood that there may be numerous users [B], shops [C], and/or banks [D].

FIG. 6 shows a credit system which includes devices 110, 120 and 130 which are connected in a network 140. In FIG. 6, the numeral 110 represents a terminal device for the agency [A], the numeral 120 represents a terminal device for the user [B] and the numeral 130 represents the terminal device for the shop [C]. The terminal devices 110, 120 and 130 each have a generator 111, 121 and 131 for generating their own individual digital signature. In addition, each terminal device has a verifier 112, 122 and 132 for verifying the digital signature; and they each have a controller 113, 123 and 133. In this embodiment, the generator and the verifier each operate according to software. The controllers 113, 123 and 133 control the operation of their respective terminal device to provide such functions as communication, signal processing, accessing control, etc.

The operation of this embodiment will now be described. The operation includes a first phase for registration or enrollment, and a second phase for carrying out a transaction.

Figure 5A:
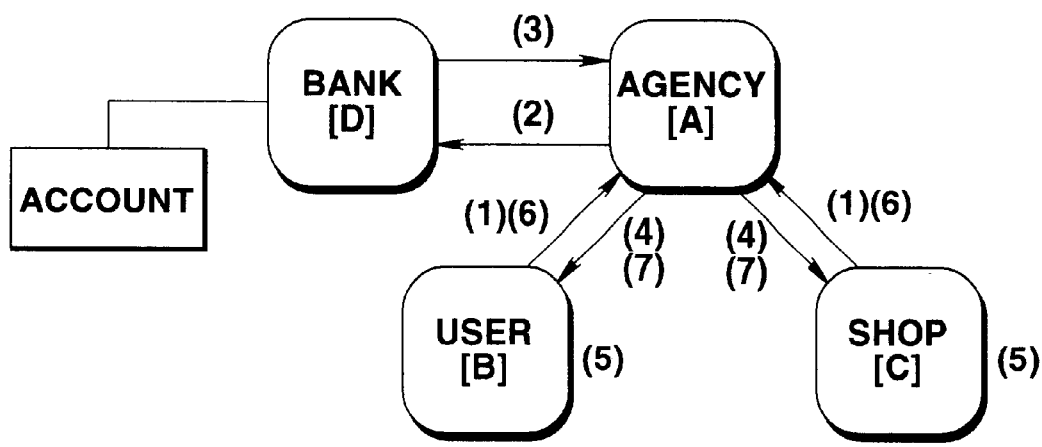
FIG. 5(a) is a block diagram showing a fourth embodiment of the invention as used in a registration phase.

First Phase—Registration (FIG. 5(a))

1. The user [B] and/or the shop [C] applies for registration or enrollment with the agency [A] and supplies the agency with the user's and/or shop's address, name, bank account number, seal, etc.

2. The agency [A] confirms the application of the user [B] and/or the shop [C] and whether or not the account of the bank is payable on behalf of the applicant.

3. If the application is correct and the account is payable, the agency [A] enrolls the user [B] and/or the shop [C] as a member.

4. The agency [A] provides the enrolled user[B] and/or the shop [C] with a digital signature generating and verification means.

In this embodiment, the means may be software for generating a signature key and a verifying key by use of a public key cryptogram.

5. The user [B] and/or the shop [C] generates a signature key (SB) and/or (SC) and a verifying key (PB) and/or (PC).

A signature key (SB) is a secret key of [B] that [B] uses to encrypt his digital signature and to encrypt a Message that [B] wishes to send.

A verifying key (PB) is a public key that can be used to decrypt a Message and a digital signature which [B] has encrypted with his signature key (SB).

6. The user [B] and/or the shop [C] keeps the signature key (SB) and/or (SC) confidential, and sends the verifying key (PB) and/or (PC) to the agency [A].

7. The agency [A] carries out the following equation for generating the agency's digital signature verifying key fB or fC:

$$fB=f^{-1}((PB), \text{ term of validity});$$

$$fC=f^{-1}((PC), \text{ term of validity}).$$

The digital signature of the agency [A] is represented by a one-way function fB or fC. With the one-way function, fB or fC it is easy for [A] to verify the digital signature of [B] or [C]; but it is difficult to operate the function fB or fC in the reverse manner to generate the digital signature. Therefore, the agency [A] uses fB or fC as a verifying key, and an inverse function $f^{-1}B$ or $f^{-1}C$ as the generating key.

The agency [A] sends the fB (digital signature encryption function for [B]) and/or the fC (digital signature encryption function for [C]) to the user [B] and/or the shop [C] via a network or on a card recorded with such data.

In this embodiment, a message M which is processed by using the means for generating the digital signature is presented as M*SB and/or M*SC. The message M which is processed by using the means for verifying the digital signature is presented as M*PB and/or M*PC.

In the step 4 of this embodiment, the agency [A] may provide a means for encryption to the user [B] and/or the shop [C]. Alternatively, the means for generating and verifying the digital signature may be used as means for encryption.

Figure 5B:
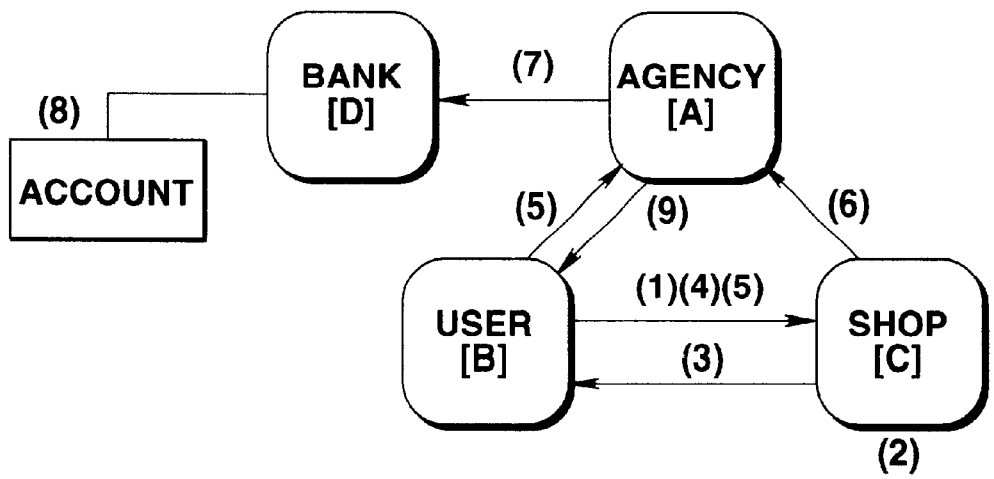
FIG. 5(b) is a block diagram showing a fourth embodiment as used in a transaction phase.

Second Phase—Carrying Out a Transaction (FIG. 5(b))

1. The user [B] sends the function fB and the following Message (19) to the shop [C]:

$$fB=f^{-1}((PB), \text{ term of validity});$$

Message (19)=[T, product G, address (destination of user [A])]*SA.

2. The shop [C] generates the agency's verifying key PA by using the one-way function fB. The shop [C] then confirms the term of validity. The shop [C] then decodes the Message (19) by using the verification key PA of the agency [A] in the following equation, and obtains T, G and the address:

[Message (19)]*PA=T, G, Address.

Then the shop [C] may notify agency [A] of the product G charge and the function fB; and the agency [A] may identify the user [B] by using the function fB to confirm the user [B]'s solvency. The agency [A] may notify the shop [C] of the user [B]'s solvency.

3. The shop [C] delivers the product G to the user [B].

4. When the user [B] receives the product G, the user sends the following Message (20) to the agency [A] and to the shop [C]:

Message (20)=[T, shop [C], Charge P]*SB.

5. If the user would like to return the product G within a predetermined cooling off period, the user may return the product G to the shop [C]. In this case the user [B] also transmits the following Message (21) to both the shop [C] and to the agency [A] within the predetermined period:

Message (21)=fB, [T, message for cancellation]*SB.

6. After the predetermined cooling off period, the shop [C] regards the transaction as valid and sends the following Message (22):

Message (22)=fC, [T, P, fB, Message (20)]*SC.

7. If the agency [A] does not receive the information (21) within the predetermined period, the agency [A] confirms the Message (22) and examines whether the transaction was proper, for example by checking both the charge in the Message (20) and the charge in the Message (22).

If the transaction is proper, the agency [A] requests the bank [D] to transfer the charge from an account of the user [B] to an account of the shop [C].

8. The bank [D] executes the transfer according to the request.

9. The agency [A] notifies the user [B] of the execution of the transfer.

In this embodiment, the agency [A] can learn that the user [B] has purchased some product having a value P; but the agency [A] cannot know what product the user [B] has purchased. Further, the shop [C] cannot obtain personal information such as the condition of the user [B]'s account.

Therefore, in this embodiment, the privacy of the user [B] is protected because no single entity has access to all information regarding the user [B].

Fifth Embodiment

Figure 7A:
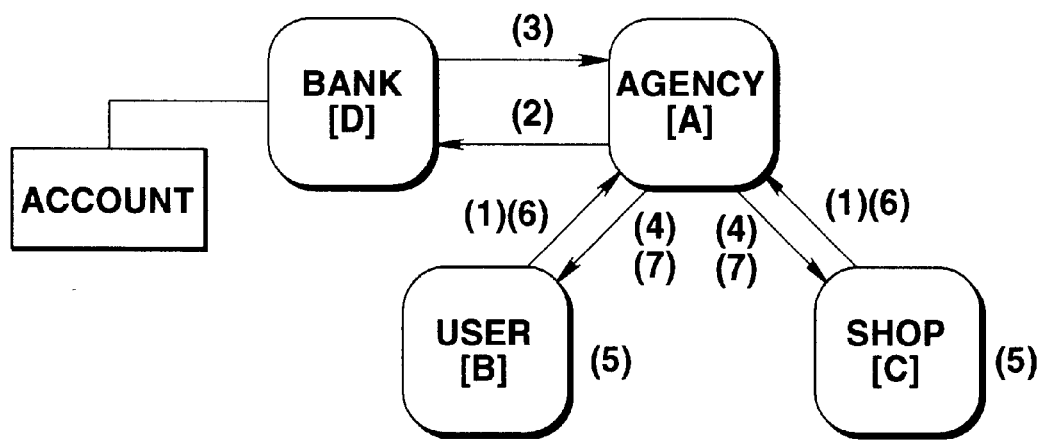
FIG. 7(a) is a block diagram showing a fifth embodiment of the invention as used in a registration phase.

The fifth embodiment of this invention will be described with reference to FIGS. 7(a) and 7(b).

The electronic credit system of this embodiment is basically the same as that of the fourth embodiment. However, the product G in this embodiment is information, which may be, for example, a motion picture, computer software, etc. Also, in this embodiment, the shop [C] sends the product G, in the form of information, via network in response to a request by the user [B].

The operation of this embodiment will now be described. The operation comprises a first phase for registration (FIG. 7(a)) or enrollment; and a second phase for carrying out a transaction (FIG. 7(b)). The first phase in this embodiment is the same as the first phase of the fourth embodiment; and therefore the description of the first phase will be omitted.

Figure 7B:
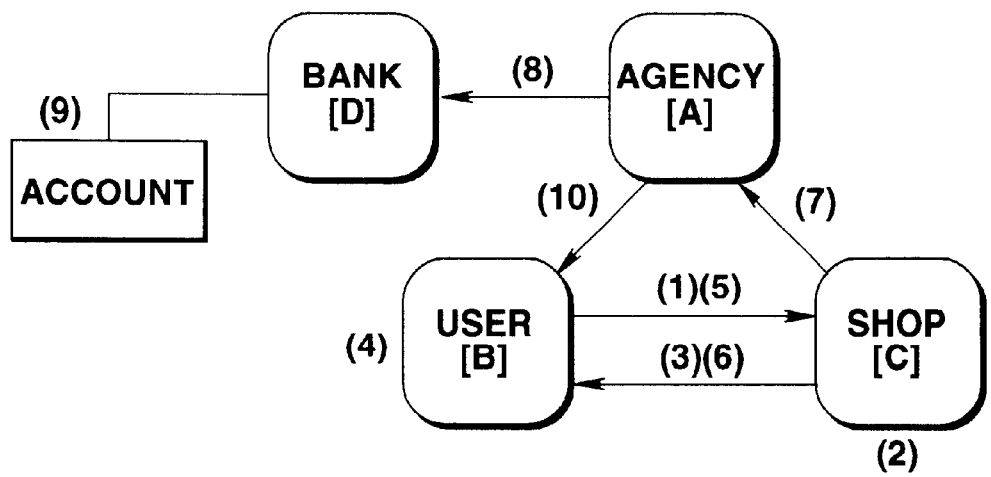
FIG. 7(b) is a block diagram showing the fifth embodiment as used in a transaction phase.

Second Phase—Carrying Out a Transaction (FIG. 7(b))

1. The user [B] sends the following function fB and the following Message (23) to the shop [C]:

$$fB = f^{-1}((PB, \text{Term of Validity});$$

Message (23)=[$T$, product $G$, Address (destination of user [$B$])] *$SB$.

2. The shop [C] generates the agency's verifying key PA by using the one-way function fB. The shop [C] then confirms the term of the user [B]'s validity. Then the shop [C] decodes the Message (23) by using the verification key PA in the following equation, to obtain T, G and the address:

[Message (23)]*$PA=T, G,$ Address.

The shop [C] may then send a notification of the charge of the product G and the function fB to the agency [A]. The agency [A] then identifies the user [B] by using the function fB so that the agency [A] can confirm the solvency of the user [B]. The agency [A] then notifies the shop [C] of the solvency of the user [B].

3. The shop [C] delivers the following Message (24) to the user[B]:

Message (24)=$fC$, [Product $G$ (in the form of encrypted information $E$), Unencrypted Header $H$ of the Information], and encrypted Information.

In this equation, the header (H), which is not encrypted, includes the time stamp T, a digest or a part of the information E, an explanation for the information E, and a charge etc.

Also, the encrypted information (E)=[product G in the form of Information E]*CsK.

CsK is a key for encryption which is supplied by the shop [C].

4. The user [B] confirms the header H.

5. If the user consents, the user [B] will send the following Message (24) to both the agency [A] and to the shop [C]:

Message (24)=[$T$, shop [$C$], Charge $P$]*$SB$.

6. After receiving the Message 24, the shop [C] sends the following Message (25) for decoding the information E to the user [B].

Message (25)=$fB[T, CpK]$*$SC$.

7. After receiving the Message (25), the shop [C] may regard the transaction as valid. Therefore the shop [C] sends the following Message (26) to the agency [A]:

Message (26)=$fC[fB,$ Message (24)]*$KC$.

8. The agency [A] then examines the validity of the transaction, for example by checking both the charge P in the Message (24) and the charge P in the Message (26).

If the transaction is valid, the agency [A] requests the bank [D] to transfer the charge from an account of the user [B] to an account of the shop [C].

9. The bank [D] executes the transfer according to the request.

10. The agency [A] notifies the user [A] of execution the transfer.

In this embodiment, the predetermined cooling off period is avoided by making a confirmation of the digest in advance. The agency [A] will know that the user [B] has purchased some product having a value of (P); but the agency [A] cannot know what product the buyer [B] has purchased. Also, the shop [C] cannot learn of personal information regarding the buyer [B], such as the user's account.

Therefore, in this embodiment, the privacy of the user [B] is protected because no single entity will have access to all information regarding the user.

If the shop [C] provides an encryption key in advance for each terminal's software, all communications in the second phase will be able to be encrypted.

Further, in each of the above described embodiments, an address (destination) of the user may not be the user's real address. In such case, the user can keep this personal information confidential as well.

The above described systems can easily be replaced with a preset credit system. In such case each encryption and communication is carried out using special software; and the user has a card such as a magnetic credit card, an IC card, a memory card, etc., which is recorded with the encryption key.

In this invention, the encrypted information or messages are not limited by the above mentioned examples; and other messages, etc. may be encrypted according to this invention.

Also, in each of the above described embodiments, if only one transaction is dealt with at a given time, the time stamp T will be omitted. This is because the transaction in such case can easily be identified. Serial numbers or random numbers may be used instead of the time stamp, if those numbers directly correspond to a particular transaction.

If the shop [C] provides the encryption key for each terminal's software in advance, all communications in the second phase will be able to be encrypted.

What is claimed is:

1. An electronic credit system comprising:
   a first terminal for a user;
   a second terminal for a shop; and
   a third terminal for an agency;
   said first terminal and said second terminal having a first common encryption means, which is common to said first terminal and to said second terminal;
   said first terminal and said third terminal having a second common encryption means which is common to said first terminal and to said third terminal;
   said second terminal and said third terminal having a third common encryption means, which is common to said second terminal and to said third terminal;
   said first terminal being arranged to send a credit request by using said second encryption means to said third terminal, to receive a credit message encrypted by use of said third encryption means corresponding to said credit request from said third terminal and to send a purchase request with product information and the credit message by first encryption means to said second terminal;

said third terminal being arranged to account for said product according to said credit message after said user receives said product corresponding to said purchase request and said first terminal sends price information of said product by second encryption means to third terminal.

2. An electronic credit system according to claim 1, wherein each terminal is connected in a common network.

3. An electronic credit system according to claim 1, wherein the each terminal includes an encryption means.

4. An electronic credit system according to claim 3, wherein said terminals include encryption means to encrypt information sent therefrom.

5. An electronic credit system according to claim 1, wherein said second terminal is arranged to send a product in the form of information.

6. An electronic credit system according to claim 5, wherein the product is computer software.

7. An electronic credit system according to claim 5, wherein the product is data for the generation of an image.

8. An electronic credit system according to claim 5, wherein the product includes a content portion and a content explanation portion.

9. An electronic credit system comprising:
   a first terminal for a user, having a digital signature generator;
   a second terminal for a shop, having a digital signature generator and means for verifying a digital signature; and
   a third terminal for an agency, having a digital signature generator and means for verifying a digital signature;
   said first terminal being arranged to send a credit request to said third terminal without product information, to receive said credit to said credit request from said third terminal and to send a purchase request to said second terminal with product information and said credit;
   said third terminal being arranged to account for said product according to said credit message after said user receives said product corresponding to said purchase request and said first terminal sends information with said product price by second encryption means to third terminal,
   wherein said first digital signature is used for said first and second terminal in common, and said second digital signature is used for said first and third terminal in common.

10. An electronic credit system according to claim 9, wherein the means for generating the digital signature of the third terminal is arranged to generate the agency's digital signature by using the user's secret key and the agency's secret key.

11. An electronic credit system according to claim 10, wherein the agency's digital signature includes a term of validity of the signature.

12. An electronic credit system according to claim 10, wherein the means for generating the digital signature of the first terminal is arranged to generate a user's digital signature by means of the agency's digital signature and a product name.

13. An electronic credit system according to claim 12, wherein the product is an information.

14. An electronic credit system according to claim 13, wherein the information includes software.

15. An electronic credit system according to claim 13, wherein the information includes image data.

16. An electronic credit system according to claim 13, wherein the information includes a content portion and an explanatory portion.

17. An electronic credit system according to claim 16, wherein the explanatory portion includes an explanation regarding at least a part of the content portion.

18. An electronic credit system according to claim 17, wherein the information is encrypted by means of the shop's public key.

19. An electronic credit system according to claim 17, wherein the second terminal is arranged to provide a key for decoding the content portion upon receipt of the user's digital signature.

20. An electronic credit system according to claim 9, wherein the means for generating digital signature and the means for verifying the digital signature operate based on a one-way public key encryption function.

21. A method of operating an electronic credit system which comprises
   a first terminal for a user,
   a second terminal for a shop, and
   a third terminal for an agency, said method comprising the steps of:
      providing said first terminal and said second terminal with a first common encryption means, which is common to said first terminal and to said second terminal;
      providing said first terminal and said third terminal with a second common encryption means which is common to said first terminal and to said third terminal;
      providing said second terminal and said third terminal with a third common encryption means, which is common to said second terminal and to said third terminal;
      causing said first terminal to send a credit request by using said second encryption means to said third terminal, to receive a credit message which has been encrypted by use of said third encryption means corresponding to said credit request from said third terminal and to send a purchase request with product information and the credit message by first encryption means to said second terminal;
      causing said third terminal to account for said product according to said credit message after said user receives said product corresponding to said purchase request and said first terminal sends information with price information of said product by second encryption means to third terminal.

22. A method of operating an electronic credit system, said method comprising the steps of:
   providing a first terminal for a user, having a digital signature generator;
   providing a second terminal for a shop, having a digital signature generator and means for verifying a digital signature; and
   providing a third terminal for an agency, having a digital signature generator and means for verifying a digital signature;
   causing said first terminal to send a credit request to said third terminal without product information, to receive said credit to said credit request from said third terminal and to send a purchase request to said second terminal with product information and said credit;

causing said third terminal to account for said product according to said credit message after said user receives said product corresponding to said purchase request and said first terminal sends information with said product price by second encryption means to third terminal, wherein said first digital signature is used for said first and second terminal in common, and said second digital signature is used for said first and third terminal in common.

23. A computer readable medium containing a program for electronically carrying out a method of operating an electronic credit system which comprises a first terminal for a user, a second terminal for a shop, and a third terminal for an agency, said method comprising the steps of:

providing said first terminal and said second terminal with a first common encryption means, which is common to said first terminal and to said second terminal;

providing said first terminal and said third terminal with a second common encryption means which is common to said first terminal and to said third terminal;

providing said second terminal and said third terminal with a third common encryption means, which is common to said second terminal and to said third terminal;

causing said first terminal to send a credit request by using said second encryption means to said third terminal, to receive a credit message which has been encrypted by use of said third encryption means corresponding to said credit request from said third terminal and to send a purchase request with product information and the credit message by first encryption means to said second terminal;

said third terminal being arranged to effect a transfer of charge from an account of said user to an account of said shop in response to a message from said user confirming receipt by said user of said product corresponding to said purchase request and said first terminal being arranged to send price information of said product by said second encryption means to said third terminal.

24. A computer readable medium containing a program for electronically carrying out a method of operating an electronic credit system, said method comprising the steps of:

providing a first terminal for a user, having a digital signature generator for generating a first digital signature;

providing a second terminal for a shop, having a digital signature generator for generating a second digital signature and means for verifying a digital signature; and providing a third terminal for an agency, having a digital signature generator for generating a third digital signature and means for verifying a digital signature;

causing said first terminal to send a credit request to said third terminal without product information, to receive said credit to said credit request from said third terminal and to send a purchase request to said second terminal with product information and said credit;

causing said third terminal to effect a transfer of charge from an account of said user to an account of said shop in response to a message from said user confirming receipt by said user of said product corresponding to said purchase request and causing said first terminal to send price information of said product to said third terminal, wherein said first digital signature is used for said first and second terminal in common, and said second digital signature is used for said first and third terminal in common.

* * * * *